United States Patent [19]

Tomite

[11] Patent Number: 4,896,066
[45] Date of Patent: Jan. 23, 1990

[54] LAMINATED ROTOR SLOT CLOSER

[75] Inventor: Toshio Tomite, Katsuta, Japan

[73] Assignee: Hitachi, Ltd., Tokyo, Japan

[21] Appl. No.: 199,270

[22] Filed: May 26, 1988

[30] Foreign Application Priority Data

Jun. 3, 1987 [JP] Japan .................. 62-138080

[51] Int. Cl.⁴ ............... H02K 15/09; H02K 1/24
[52] U.S. Cl. ............................. 310/214; 310/42
[58] Field of Search ............... 29/598; 310/42, 214, 310/216, 218, 261, 45

[56] References Cited

U.S. PATENT DOCUMENTS

| | | | |
|---|---|---|---|
| 2,781,465 | 2/1957 | Schuff | 310/214 |
| 3,586,893 | 6/1971 | Okamoto | 310/166 |
| 4,829,206 | 5/1989 | Honshima et al. | 310/214 |

FOREIGN PATENT DOCUMENTS 52-9805  1/1977  Japan .
206244  12/1982  Japan .................. 310/214

Primary Examiner—Patrick R. Salce
Assistant Examiner—D. L. Rebsch
Attorney, Agent, or Firm—Antonelli, Terry & Wands

[57] ABSTRACT

An armature is formed by laminating cores having through window portions which are provided in the vicinity of the surface on the slot open sides of tooth portions. The through window portions have partly opened portions, respectively. Coils are wound in slots of the laminated core. By pressing the through window portions, cut-open portions of the slot are deformed to provide outwardly curved projecting portions spaced from the coils to prevent the slipping-out of the coils.

2 Claims, 2 Drawing Sheets

LAMINATED ROTOR SLOT CLOSER

FIELD OF THE INVENTION

The present invention relates to a manufacturing method of an armature of a rotary machine, and particularly to an armature of a rotary electric machine suitable for forming a half-closed slot which is effective for the prevention of slipping-out of windings.

BACKGROUND OF THE INVENTION

The half-closed slot for preventing the slipping-out of windings in the armature of the rotary machine is usually formed by providing beforehand a projecting portion in the vicinity of a slot portion on the slot open side of the armature and by bending the projecting portion inside the slot by pressing or the like, as is disclosed, for instance, in U.S. Pat. No. 3,586,893 patented on June 22, 1971 entitled "Armature Core" and Japanese Patent Laid-Open No. 52-9805 (1977) published on Jan. 25, 1977 entitled "Manufacturing Method of Armature of Small-scale rotary machine".

However, the above-stated prior art has disadvantages, as will be described below.

On the occasion when the projecting portion is bent inside the slot by pressing or the like, the fore end portion of this bent projecting portion bends down to cause damage to an insulating coat on the surface of a winding held in the slot, thus tending to cause dielectric breakdown. Moreover, as in the armature of Japanese Patent Laid-Open No. 52-9805 (1977) of the above-mentioned prior part, when the projecting portion is grooved on the lateral side thereof and bent inside the slot, the mechanical strength of the aforesaid projecting portion is deteriorated by a groove provided on the lateral side of the projecting portion for bending, and consequently said portion is sometimes cut off in the course of high-speed rotation. Furthermore, when the half-closed slot is formed by pressing a semicircular projection in the armature core of U.S. Pat. No. 3,586,893 mentioned above, a large load pressure is needed, which requires employment of a large-sized apparatus, and also this art involves a drawback that irregularity is easily formed on the outer peripheral surface of the armature when the half-closed slots are formed by pressuring the semicircular projections, so that the uniformity of magnetic reluctance of the armature tends to be deteriorated.

SUMMARY OF THE INVENTION

An object of the present invention is to furnish an armature of a rotary electric machine and a manufacturing method thereof wherein a projecting portion for preventing the slipping-out of windings is formed in the open portion of a slot so that the inside of the slot can be formed in a curved shape without fail.

The object of the present invention is attained by a method wherein a through window portion whose outer periphery is cut to be opened partly is provided in the vicinity of a slot open side of a core tooth portion between slots of an armature core, lamination is made, an armature coil is provided by winding, a projecting portion (anchor) is formed on the opposite lateral sides of a slot open end thereafter by pressing the surface of the armature core, and thereby the half-closed slot is formed.

A partly-open through window portion provided in the vicinity of the outer peripheral surface of a tooth portion of the armature core has a cut-open portion in the outer periphery. In the case when this portion is deformed by pressing, a core portion forming a projecting portion (anchor) for preventing the slipping-out of windings is prevented from bending down inside a slot by tension produced by the annular portion of the deformed portion, and thus an ideal curved projecting portion can be attained, while the projecting portion can be formed in large extension inside the slot due to the presence of the aforesaid cut-open portion. In the open end of the slot, in this way, the projecting portion for preventing the slipping-out of windings which has an ideal shape of the inner periphery being curved and also a relatively large projection can be obtained.

DETAILED DESCRIPTION OF THE PREFERRED EMBODIMENTS

Figure 1:
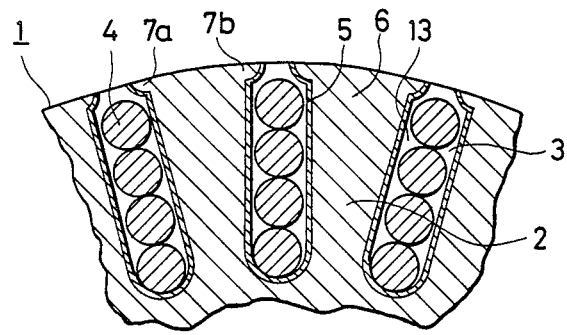
FIG. 1 shows a partial section of an armature of a rotary machine according to the present invention.

FIG. 1 shows a section of a part of an armature 1 of a motor of an automobile starter, for instance, which is manufactured according to the present invention. In the figure, a plurality of steel plates machined to have a prescribed shape are laminated on a rotating shaft (not shown in the figure) to construct an armature core 2. A plurality of slots 3 extending in the direction of the shaft are provided in the circumferential surface of this substantially cylindrical armature core 2, and a plurality (four in the present embodiment) of armature coils 4, each having a surface coated for insulation, are provided by winding in each slot 3. Moreover, insulating paper 5 is provided on the inner peripheral surface of the slot 3 to protect the insulation between the armature coils 4 and the core 2. Besides, an insulated mold 13, such as varnish, for fixing the coils 4 is packed in the slot 3 in the figure.

As is apparent from the figure, projecting portions (anchors) 7a and 7b expanded on the opposite sides so that the inside of the slot is curved are formed in the opposite end portions of the fore end of an armature core 2. Thereby the slot 3 is put in a half-closed state, whereby the slipping-out of the coils is prevented when an armature is rotated.

Next, a method of forming a half-closed slot by the projecting portions 7a and 7b of FIG. 1 will be described in detail with reference to FIGS. 2 to 4.

Figure 2:
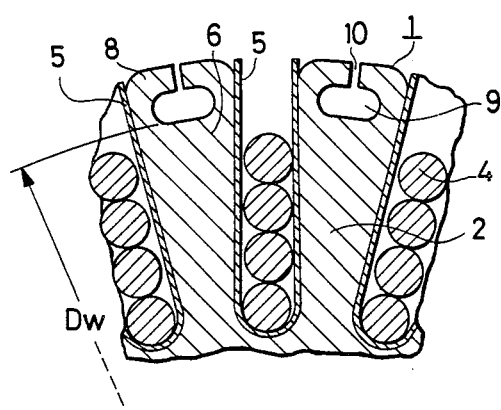
FIG. 2 shows a state wherein the armature core is constructed by laminating steel plates having a predetermined shape.

Referring to FIG. 2, an annular portion 8 of a laminated core forming a window portion at least a part of which is opened outside is formed in the fore end portion of a tooth portion 6 of the steel plates constituting an armature core 2, in other words, in the vicinity of the outer peripheral surface thereof. In other words, a cut-open portion 10, together with a through hole 9, is formed in the fore end portion of the tooth portion 6 of the core on the occasion when the steel plates are punched to be in a prescribed shape, for instance. In this state, projecting portions shown in 7a and 7b of FIG. 1 are not yet formed in the fore end portion of a slot 3, and armature coils 4 are inserted through the open end portion thereof after insulating paper 5 is provided inside it. In the figure, mark $D_w$ denotes a distance from the center of the rotating shaft of an armature 1 to the aforesaid window portion.

Figure 3:
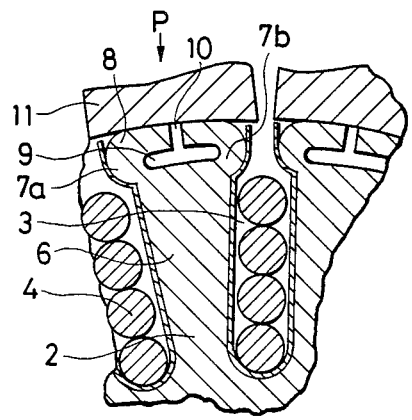
FIG. 3 shows a state wherein, after the armature coils are inserted into the slot as shown in FIG. 2, pressing is made by a pressing tool from the direction indicated by an arrow P.
Figure 5:
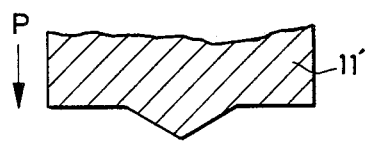
FIG. 5 shows a section of another example of a pressing tool of FIG. 3.

Referring to FIG. 3, the opposite end portions 9 of the annular portion 8 of a laminated core are deformed while projecting onto the slot 3 side when a partly-open window portion formed in the fore end of the core tooth portion 6 is crushed to be deformed by a pressing load P. On the occasion of pressing, however, the upper end face of the aforesaid annular portion 8 is in contact with the pressing tool 11, and therefore it does not occur that this portion is bent onto the slot 3 side with the fore end bending down inside the slot. Instead, the inside of the slot is turned into a curved shape by this pressing, and thus the projecting portions 7a and 7b shaped ideally and spaced from the coils 4 so as not to damage the surface insulating coat 5 of the armature coils 4 held inside can be formed as outwardly curved projections for preventing the slipping-out of the coil 4. Besides, the upper end of the annular portion 8 of the core is separated to the right and left by the opened portion 10 on the occasion of this pressing, and this opened portion 10 is expanded with the formation of the projecting portions 7a and 7b by the pressing. Therefore said projecting portions 7a and 7b project easily inside the slot 3, and thus the projecting portions 7a and 7b larger than those formed when the opened portion 10 is not provided in the upper end of the annular portion can be obtained. Furthermore, in order to make the projecting portions 7a and 7b project to a larger extent, a pressing tool 11' for opening an aperture of the aforesaid opened portion 10 to be wider, e.g. a tool having such a section as shown in FIG. 5, can be employed instead of the pressing tool 11 of FIG. 3.

Figure 4:
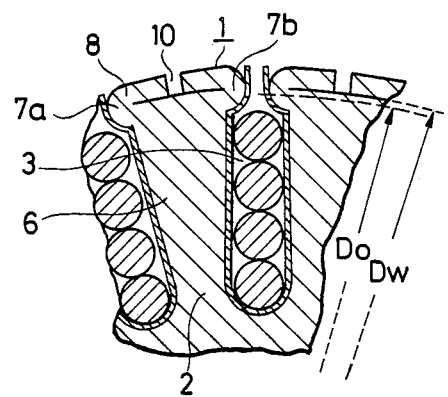
FIG. 4 shows an armature wherein the fore end of the tooth portion of the laminated core, i.e. the through hole of the window portion thereof, is crushed by the pressing process and, consequently, the upper end portion is put in a state of close contact with the upper end of the tooth portion.

After the fore end of the tooth portion 6 of the laminated core 2, i.e. the through hole 9 of the window portion thereof, is crushed by the above-stated pressing process as shown in FIG. 4, and consequently, the upper end portion is put in a state of close contact with the upper end of the tooth portion 6; varnish, for instance, is packed in the slot 3 to fix the coils therein, and the outer periphery of the armature 1 is machined to be cut, so as to remove the unnecessary portion of the window portion crushed by the pressing process, i.e. the upper end portion of the annular portion 8 of the core. By this cutting, the surface of the armature 1 is made smooth as shown also in FIG. 1.

In the FIG. 4, mark $D_w$ denotes a distance from the center of the rotating shaft to the window portion, and further mark $D_o$ denotes a distance between the center of the rotating shaft and the cut portion of the armature 1 formed by the aforesaid cutting. This distance $D_o$ is equal to or smaller than $D_w$ at least, and it is selected, of course, to be within a range wherein the projecting portions 7a and 7b formed in the fore end of the aforesaid tooth portion 6 of the core are left sufficiently long.

In the above-described embodiment, i.e. in the armature 1 of a starter motor, the aforesaid cutting process is conducted to make uniform the magnetic reluctance of the surface of the armature. It is also possible to use the armature in the state of FIG. 4 as it is. In this case, however, the surface magnetic reluctance becomes non uniform, because of the presence of the annular portion 8 of the core and the opened portion 10 thereof pressed to contact closely the fore end of the tooth portion 6 of the core, and magnetism passing through the core is divided to the right and left to the center of the aforesaid opened portion 10. In the above-described embodiment, besides, varnish or the like is packed in the slot 3 after the completion of the pressing process. It will be apparent, in this relation, that this packing is not necessarily needed for a motor of which the number of revolutions is not very large, or the like.

Figure 6A:
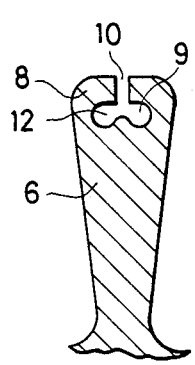
FIGS. 6A, 6B, and 6C show other examples of window portions of a core shown in FIG. 2.
Figure 6B:
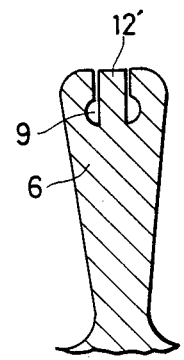
Figure 6C:
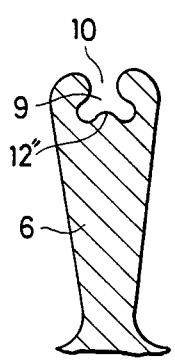

Next, FIGS. 6A, 6B and 6C show other examples of deformation with respect to the shape of the window portion formed in the fore end of the tooth portion 6 of the armature core 1. In the case of the shape of the window portion shown in FIG. 2, the annular portion 8 of the core is expanded onto the opposite sides of the tooth portion by pressing, so as to form the projecting portions 7a and 7b. In an embodiment of FIG. 6A, the window portion formed in the fore end of the tooth portion 6 of the core is provided, in the substantially central part of the through hole 8 thereof, with a protuberant portion 12 opposite to the opened portion 10. When the window portion shaped as above-stated is pressed, the annular portion 8 of the core in the fore end of the tooth portion 6 of the core is expanded on both sides easier than that of FIG. 2, and thereby the projecting portions, which are larger than the projecting portions 7a and 7b of FIG. 4 can be obtained.

In an example of deformation shown in FIG. 6B, a protuberant portion 12' is made larger than the one of FIG. 6A with a view to obtaining also the projecting portions 7a and 7b enlarged further on the lateral sides by the plastic deformation of the window portion of the core at the time of pressing. Moreover, an example of deformation of FIG. 6C, although similar in shape to the one of FIG. 6A, is aimed at enabling smoother plastic deformation of the core by pressing by constructing the window portion of the core and, especially, a protuberant portion 12", to be curved.

As described above, the manufacturing method of an armature according to the present invention enables the sure manufacture, by a relatively simple apparatus, of the armature of a rotary machine having projecting portions (anchors) which have an ideal shape of a curved outer peripheral surface spaced from the windows in the slot and causing no damage to the surface coat of the windings and which can be expanded to a relatively large extent.

What we claim is:

1. An armature of a rotary machine comprising a laminated core having a plurality of slots formed therein, windings wound in the slots of the laminated core, and projecting portions formed by deforming partly open portions of the slots of the laminated core so as to prevent a slipping-out of the windings from the slots, each of the projecting portions having a curved outer peripheral surface provided in a vicinity of a slot open side of a tooth portion between the slots of the laminated core, an insulating paper provided on a surface of each slot and on the curved projecting portions, an insulating material provided between the insulating paper and the windings in each slot and between adjacent projecting portions of a respective slot having the insulating paper provided thereon, the adjacent curved projecting portions of a respective slot being spaced from one another so as to delimit a cut-open portion having a width smaller than the width of a respective slot, the adjacent curved projecting portions being spaced from the windings of the slot so that the curved projecting portions cause substantially no damage to a surface of the windings.

2. An armature of a rotary machine according to claim 1, wherein the adjacent curved projecting portions of a respective slot are provided at opposing surfaces of the open side of the slot.

* * * * *